(12) United States Patent
Nagashima et al.

(10) Patent No.: US 11,352,026 B2
(45) Date of Patent: Jun. 7, 2022

(54) VEHICLE, VEHICLE MONITORING SERVER, VEHICLE MONITORING SYSTEM, AND VEHICLE MONITORING METHOD

(71) Applicant: HONDA MOTOR CO., LTD., Tokyo (JP)

(72) Inventors: Masaaki Nagashima, Wako (JP); Hideki Matsunaga, Wako (JP); Takeru Goto, Wako (JP); Toshiaki Takano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 16/761,550

(22) PCT Filed: Nov. 6, 2017

(86) PCT No.: PCT/JP2017/039874
§ 371 (c)(1),
(2) Date: May 5, 2020

(87) PCT Pub. No.: WO2019/087379
PCT Pub. Date: May 9, 2019

(65) Prior Publication Data
US 2020/0262452 A1 Aug. 20, 2020

(51) Int. Cl.
*B60W 60/00* (2020.01)
*G01C 21/34* (2006.01)
(Continued)

(52) U.S. Cl.
CPC .... *B60W 60/0053* (2020.02); *B60W 60/0059* (2020.02); *G01C 21/3407* (2013.01);
(Continued)

(58) Field of Classification Search
CPC .......... B60W 60/0053; B60W 60/0059; G08G 1/207; G08G 1/091; G08G 1/20;
(Continued)

(56) References Cited

U.S. PATENT DOCUMENTS 8,812,024 B2 * 8/2014 Obermeyer ........ G08B 21/0283
455/456.1
9,075,413 B2 * 7/2015 Cullinane et al. ... G05D 1/0212
(Continued)

FOREIGN PATENT DOCUMENTS

JP 05-165520 A 7/1993
JP 2000-331282 A 11/2000
(Continued)

OTHER PUBLICATIONS

PCT/ISA/210 from PCT/2017/039874 with the English translation thereof.
(Continued)

*Primary Examiner* — Dale W Hilgendorf
(74) *Attorney, Agent, or Firm* — Carrier Blackman & Associates, P.C.; Joseph P. Carrier; Jeffrey T. Gedeon

(57) ABSTRACT

Provided are a vehicle, a vehicle monitoring server, a vehicle monitoring system, and a vehicle monitoring method, that can be suitably used in a configuration whereby the vehicle and the vehicle monitoring server communicate in relation to a travel caution region. A first control device in the vehicle sends an entry notification signal to the vehicle monitoring server prior to entry into a travel caution region, if the travel caution region is included in a target route or a target track. The first control device may also send a passage completed signal to the vehicle monitoring server after passing through the travel caution region. A second control device in the vehicle monitoring server performs an error output if, after receiving an entry notification signal from a specified vehicle, a passage completed signal has not been received by a second prescribed point in time.

14 Claims, 9 Drawing Sheets

(51) Int. Cl.
  *G01C 21/36*   (2006.01)
  *G01S 19/42*   (2010.01)
  *G05D 1/02*    (2020.01)
  *G08G 1/09*    (2006.01)
  *G08G 1/00*    (2006.01)

(52) U.S. Cl.
  CPC .......... *G01C 21/3691* (2013.01); *G01S 19/42* (2013.01); *G05D 1/0214* (2013.01); *G05D 1/0287* (2013.01); *G08G 1/091* (2013.01); *G08G 1/20* (2013.01); *G08G 1/207* (2013.01); *G05D 2201/0213* (2013.01)

(58) Field of Classification Search
  CPC . G01C 21/3407; G01C 21/3691; G01S 19/42; G05D 1/0214; G05D 1/0287; G05D 2201/0213
  See application file for complete search history.

(56) References Cited

U.S. PATENT DOCUMENTS

| | | | | |
|---|---|---|---|---|
| 9,821,817 | B2* | 11/2017 | Desnoyer | G05D 1/0061 |
| 9,908,534 | B2* | 3/2018 | Desnoyer | B60W 30/16 |
| 10,246,097 | B1* | 4/2019 | Fields et al. | B60W 60/0059 |
| 10,276,044 | B2* | 4/2019 | Ono | G08G 1/093 |
| 11,084,501 | B2* | 8/2021 | Ueno | B60W 30/18 |
| 2013/0211656 | A1* | 8/2013 | An | G05D 1/0285 701/25 |
| 2014/0330478 | A1 | 11/2014 | Cullinane et al. | |
| 2017/0203770 | A1* | 7/2017 | Kondo | G05D 1/0061 |
| 2018/0120844 | A1* | 5/2018 | Okamoto | G05D 1/0061 |
| 2018/0203455 | A1* | 7/2018 | Cronin | G05D 1/0061 |
| 2019/0118833 | A1* | 4/2019 | Goto | B60W 30/16 |

FOREIGN PATENT DOCUMENTS

| | | |
|---|---|---|
| JP | 2001-184592 A | 7/2001 |
| JP | 2007-297013 A | 11/2007 |
| JP | 2011-128901 A | 6/2011 |
| JP | 2014-148180 A | 8/2014 |
| JP | 2016-049933 A | 4/2016 |
| JP | 2017-004214 A | 1/2017 |
| JP | 2017-061320 A | 3/2017 |
| JP | 2017-107270 A | 6/2017 |

OTHER PUBLICATIONS

Office Action and search report dated Sep. 15, 2021 issued over the corresponding Chinese Patent Application No. 201780096580.0 with the English translation of the pertinent portion.

* cited by examiner

VEHICLE, VEHICLE MONITORING SERVER, VEHICLE MONITORING SYSTEM, AND VEHICLE MONITORING METHOD

TECHNICAL FIELD

The present invention relates to a vehicle, a vehicle monitoring server, a vehicle monitoring system, and a vehicle monitoring method that perform control associated with vehicle monitoring.

BACKGROUND ART

Japanese Laid-Open Patent Publication No. 2017-061320 (referred to below as "JP 2017-061320 A") aims to provide an automated driving vehicle capable of traveling while observing traffic regulations and following road signs or road markers even though the driver contravenes traffic regulations by intent or the driver overlooks road signs or road markers through negligence during driving (including parking or a stop) of the vehicle ([0006] and Abstract).

To achieve this object, the automated driving vehicle disclosed in JP 2017-061320 A (Abstract) has a manual driving mode and an automated driving mode. The automated driving vehicle has condition element detection means for detecting one or more condition elements used for a user's own vehicle to decide whether one or more switching conditions predefined based on traffic regulations are met. The automated driving vehicle also has decision means for deciding whether the switching conditions are met based on a detection output from the condition element detection means during traveling in the manual driving mode, parking, or a stop. The driving mode control means performs switching from the manual driving mode to the automated driving mode when the decision means decides that the switching conditions are met.

The switching conditions include conditions for preventing driving that violates traffic regulations such as "no passing", "right turn (left turn) prohibition", "speed limit", "compliance with traffic light", and "temporary stop at railroad crossing". The switching conditions also include conditions for ensuring safe driving by avoiding accident-prone states such as "neglecting of temporary stop at crosswalk", "obstructing driving", "dangerous driving and reckless driving", and "sudden acceleration, sudden braking, and sudden turning" ([0048], FIG. 2, and FIG. 3).

Regarding "railroad crossing" of the switching conditions, when the road sign indicating the presence of a railroad crossing or when an actual railroad crossing is detected, switching to the forced automated driving mode is performed ([0064] and FIG. 2). In the forced automated driving mode, an operation for returning to the manual driving mode is disabled ([0016]). In the case of a railroad crossing, the forced automated driving mode "makes a temporary stop, confirms the safety, and makes a start" and the release condition is met when "pass of railroad crossing" is detected ([0065] and FIG. 2).

SUMMARY OF INVENTION

As described above, in JP 2017-061320 A, the vehicle travels in the forced automated driving mode at a railroad crossing ([0065] and FIG. 2). However, a configuration in which the vehicle communicates with the server in association with the travel attention region is not considered in JP 2017-061320 A. This is also true of other travel attention regions (such as a snowy road and an intersection).

The present invention has been made in consideration of the above-described problems, and has an object of providing a vehicle, a vehicle monitoring server, a vehicle monitoring method, and a vehicle monitoring system that are preferably applicable to the configuration in which the vehicle communicates with the vehicle monitoring server in association with a travel attention region.

A vehicle according to the present invention includes: a first communication device configured to communicate with an outside of the vehicle; and a first control device configured to perform automated driving control, preset a travel attention region when performing the automated driving control, and, when the travel attention region is included in a target route or a target trajectory, transmit an entry notice signal to a vehicle monitoring server via the first communication device before the vehicle enters the travel attention region, wherein the first control device requests a vehicle occupant to switch to manual driving if transmission of the entry notice signal has not been completed normally.

According to the present invention, before the vehicle enters the travel attention region, the entry notice signal is transmitted to the vehicle monitoring server. Thus, in the configuration in which, for example, the vehicle monitoring server having received the entry notice signal transmits an acknowledgement signal to the vehicle, the vehicle can confirm that the first communication device is operating normally. In addition, the vehicle monitoring server having received the entry notice signal can recognize that the vehicle starts entering the travel attention region. Accordingly, for example, the vehicle monitoring server can focus on the monitoring of the vehicle having started entering the travel attention region. Thus, the present invention can be preferably applied to the configuration in which the vehicle communicates with the vehicle monitoring server in association with the travel attention region.

The first control device may permit the vehicle to enter the travel attention region on condition that transmission of the entry notice signal has been completed normally. This makes it possible to confirm that transmission of the entry notice signal has been completed normally.

When transmission of the entry notice signal has not been completed normally, the first control device may prohibit the vehicle from entering the travel attention region or may permit the vehicle to enter the travel attention region on condition of a predetermined travel restriction. This makes it possible to take appropriate measures when transmission of the entry notice signal has not been completed normally.

The first control device may determine whether the vehicle has passed through the travel attention region, based on surrounding environment information. In addition, the first control device may transmit a pass completion signal to the vehicle monitoring server via the first communication device if the first control device determines that the vehicle has passed through the travel attention region.

According to the present invention, when the vehicle has passed through the travel attention region, the pass completion signal is transmitted to the vehicle monitoring server. This enables the vehicle monitoring server having received the pass completion signal to recognize that the vehicle has passed through the travel attention region. As a result, for example, the vehicle monitoring server can relax the monitoring of the vehicle that entered the travel attention region before.

The travel attention region may include a railroad crossing. This enables the vehicle monitoring server having received the entry notice signal to recognize that the vehicle has started entering the railroad crossing. Accordingly, for example, the vehicle monitoring server can focus on the monitoring of the vehicle having started entering the railroad crossing.

The first control device may transmit vehicle occupant information indicating a manned or unmanned state to the vehicle monitoring server, in addition to the entry notice signal, when the travel attention region is included in the target route or the target trajectory of the vehicle. This enables the vehicle monitoring server to determine whether the vehicle is in a manned or unmanned state and take measures suitable for that state.

The first control device may determine that transmission of the entry notice signal has not been completed normally when the first control device does not receive an acknowledgement signal from the vehicle monitoring server by a time at which a first predetermined point of time is reached after having transmitted the entry notice signal. This makes it possible to permit a normal travel in the travel attention region on condition of confirming that communication with the vehicle monitoring server has succeeded.

A vehicle monitoring server according to the present invention includes: a second communication device configured to communicate with first communication devices of a plurality of vehicles; and a second control device configured to monitor presence or absence of incoming of an entry notice signal from each of the plurality of vehicles; when receiving the entry notice signal from a particular vehicle of the vehicles, monitor presence or absence of incoming of a pass completion signal from the particular vehicle; and perform an error output when not receiving the pass completion signal by a time at which a second predetermined point of time is reached after having received the entry notice signal from the particular vehicle.

According to the present invention, after having received the entry notice signal from the particular vehicle, when the vehicle monitoring server does not receive the pass completion signal by a time at which the second predetermined point of time is reached, the vehicle monitoring server performs an error output. This makes it possible to address a situation in which the vehicle remains in the travel attention region.

A vehicle monitoring system according to the present invention includes: a plurality of the vehicles; and the vehicle monitoring server.

A vehicle monitoring method according to the present invention is a method of monitoring a plurality of vehicles via a vehicle monitoring server. A first control device of each of the vehicles presets a travel attention region, and when the travel attention region is included in a target route or a target trajectory, transmits an entry notice signal to a vehicle monitoring server via the first communication device before the vehicle enters the travel attention region. A second control device of the vehicle monitoring server monitors presence or absence of incoming of the entry notice signal from each of the plurality of vehicles, monitors presence or absence of incoming of a pass completion signal from a particular vehicle of the vehicles when receiving the entry notice signal from the particular vehicle via a second communication device, and performs an error output when not receiving the pass completion signal by a time at which a second predetermined point of time is reached after having received the entry notice signal from the particular vehicle.

A vehicle monitoring method according to the present invention is a method of monitoring a plurality of vehicles via a vehicle monitoring server. A position sensor of each of the vehicles detects a current position of the vehicle. A first control device of the vehicle transmits the current position of the vehicle to the vehicle monitoring server via a first communication device. A second control device of the vehicle monitoring server presets a travel attention region, monitors the current position via a second communication device from each of the plurality of vehicles, and performs an error output when a particular vehicle of the vehicles does not pass through the travel attention region by a time at which a third predetermined point of time is reached after the particular vehicle has entered the travel attention region.

According to the present invention, after the particular vehicle has entered the travel attention region, when the particular vehicle does not pass through the travel attention region by a time at which a third predetermined point of time is reached, the vehicle monitoring server performs an error output. This makes it possible to address an abnormal situation earlier when the particular vehicle remains in the travel attention region.

When switching to the manual driving is not completed, the first control device may determine whether it is possible to bypass the travel attention region, and if it is possible to bypass the travel attention region, the first control device may change the target route or the target trajectory to thereby cause the vehicle to bypass the travel attention region.

If it is determined that it is not possible to bypass the travel attention region, the first control device may cause the vehicle to stop in front of the travel attention region.

A time period from reception of the entry notice signal to the time at which the second predetermined point of time is reached may be set to a different value depending on a type of the travel attention region.

DESCRIPTION OF EMBODIMENTS

A. First Embodiment

Figure 1:
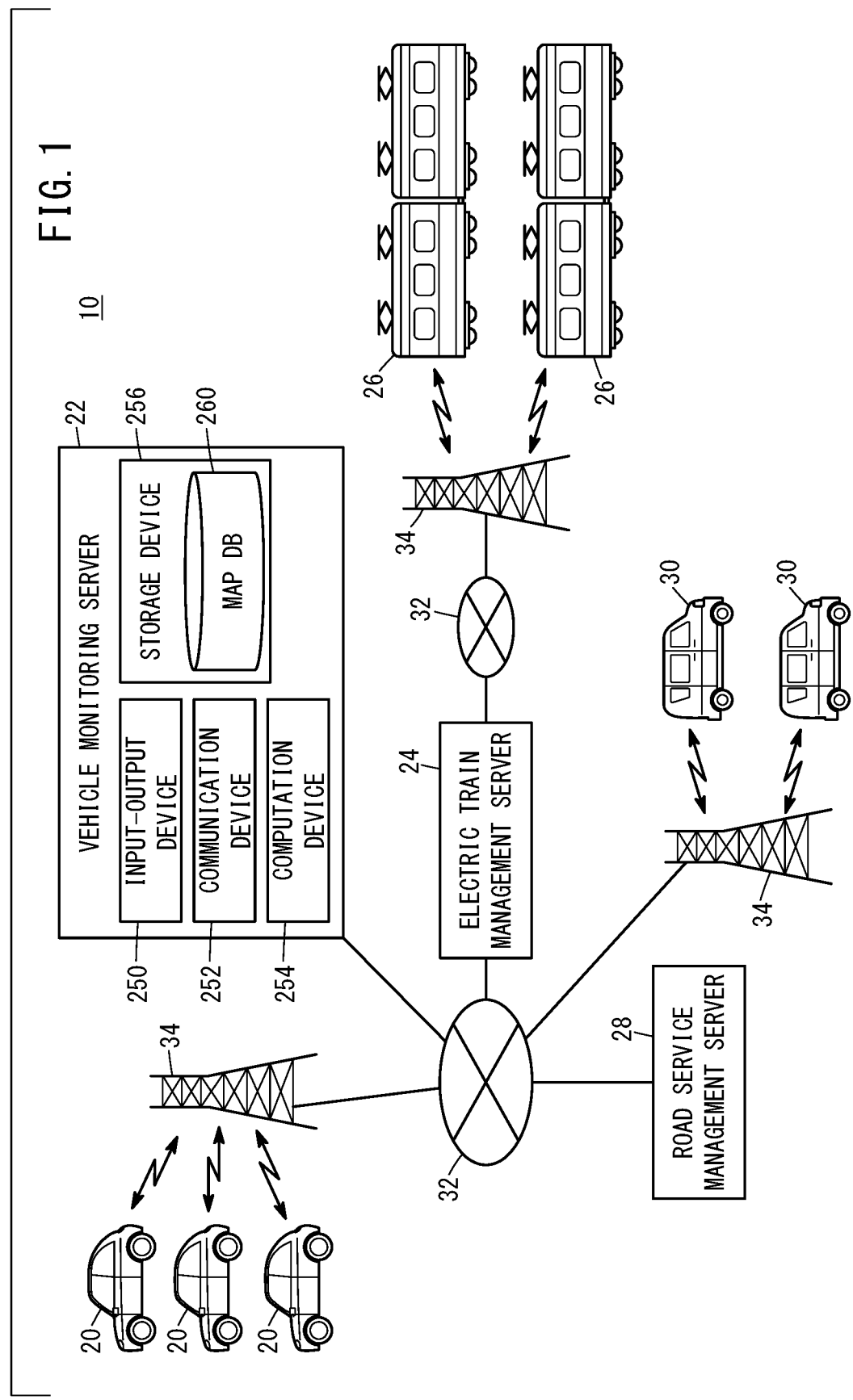
FIG. 1 is a schematic configuration diagram illustrating a vehicle monitoring system according to a first embodiment of the present invention.

FIG. 1 is a schematic configuration diagram illustrating a vehicle monitoring system 10 (also referred to below as "a monitoring system 10") according to a first embodiment of the present invention. The monitoring system 10 includes a plurality of vehicles 20, a vehicle monitoring server 22, an electric train management server 24, a plurality of electric trains 26, a road service management server 28, and a plurality of road service vehicles 30.

In the monitoring system 10, when the vehicle 20 travels in a travel attention region Ac (such as a railroad crossing 300 or the like in FIG. 4), the vehicle monitoring server 22 monitors whether the vehicle 20 has passed through the travel attention region Ac by communicating with the vehicle 20 via a communication network 32 (including a relay 34). When the vehicle 20 remains in the travel attention region Ac for an excessively long time, the vehicle monitoring server 22 give notification to the electric train management server 24 or the road service management server 28 depending on the type of the travel attention region Ac.

The electric train management server 24 having received the notification from the vehicle monitoring server 22 instructs the electric trains 26 to make an urgent stop via the communication network 32. In addition, the road service management server 28 having received the notification from the vehicle monitoring server 22 instructs the road service vehicles 30 to check situations via the communication network 32.

Figure 2:
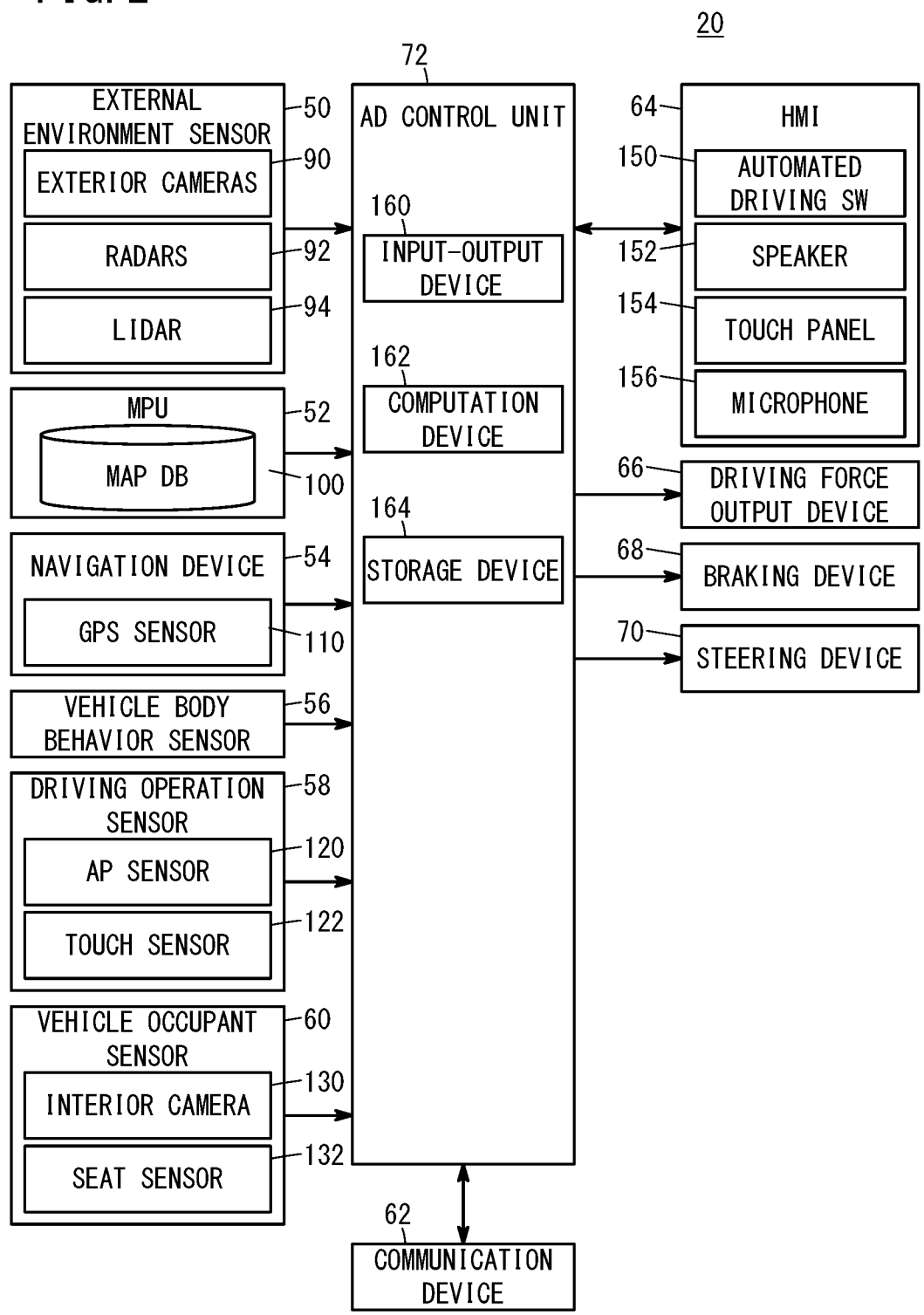
FIG. 2 is a block diagram schematically illustrating a configuration of a vehicle according to the first embodiment.

FIG. 2 is a block diagram schematically illustrating a configuration of the vehicle 20 according to the first embodiment. The vehicle 20 (also referred to below as "the user's own vehicle 20") includes an external environment sensor 50, a map positioning unit 52 (referred to below as "a MPU 52"), a navigation device 54, a vehicle body behavior sensor 56, a driving operation sensor 58, a vehicle occupant sensor 60, a communication device 62 (also referred to below as "a first communication device 62"), a human-machine interface 64 (referred to below as "a HMI 64"), a driving force output device 66, a braking device 68, a steering device 70, and an automated driving control unit 72 (also referred to below as "an AD unit 72").

The external environment sensor 50 detects information (also referred to below as "external environment information") about the external environment of the vehicle 20. The external environment sensor 50 includes a plurality of exterior cameras 90, a plurality of radars 92, and a LIDAR 94 (light detection and ranging).

The plurality of exterior cameras 90 (also referred to below as "the cameras 90") output image information about a surrounding image acquired by capturing images of the surroundings (front, sides, and rear) of the vehicle 20. The plurality of radars 92 output radar information indicating reflected waves of electromagnetic waves transmitted to the surroundings (front, sides, and rear) of the vehicle 20. The LIDAR 94 continuously emits laser beam omnidirectionally from the vehicle 20, measures the three-dimensional position of the reflection point based on the reflected waves, and outputs the measured position as three-dimensional information.

The MPU 52 manages a map database 100 (referred to below as "a map DB 100" or "a first map DB 100"). The first map DB 100 stores map information having a positional accuracy within one centimeter. The MPU 52 provides the map information in response to a request from the navigation device 54 or the AD unit 72.

The navigation device 54 has a global positioning system sensor 110 (referred to below as "a GPS sensor 110"). The GPS sensor 110 detects a current position of the vehicle 20. The navigation device 54 calculates a target route from the current position to a destination and guides the vehicle occupant. When calculating the target route, the navigation device 54 acquires the map information from a map database (not illustrated) of the navigation device 54 and uses the acquired map information. The map information included in the map database of the navigation device 54 has a lower definition than the map information included in the first map DB 100. The destination is input via the HMI 64 (particularly, a touch panel 154 or a microphone 156).

The vehicle body behavior sensor 56 detects information (also referred to below as "vehicle body behavior information") about the behavior of the vehicle 20 (particularly, the vehicle body). The vehicle body behavior sensor 56 includes a vehicle speed sensor, an acceleration sensor, and a yaw rate sensor (these are not illustrated). The vehicle speed sensor detects the vehicle speed [km/h] and the travel direction of the vehicle 20. The acceleration sensor detects the acceleration [m/s/s] of the vehicle 20. The acceleration includes a front-rear acceleration, a lateral acceleration, and a vertical acceleration (the acceleration may include only a part of these directions). The yaw rate sensor detects the yaw rate [rad/s] of the vehicle 20.

The driving operation sensor 58 detects information (also referred to below as "driving operation information") about driving operation by the driver. The driving operation sensor 58 includes an accelerator pedal sensor 120 (also referred to below as "an AP sensor 120"), a steering touch sensor 122 (also referred to below as "a touch sensor 122"), and a brake pedal sensor (not illustrated).

The AP sensor 120 detects an operation amount (also referred to below as "an AP operation amount") [%] of an accelerator pedal (not illustrated). The touch sensor 122 detects contact with a steering handle (not illustrated) by the vehicle occupant (driver). The brake pedal sensor (also referred to below as "the BP sensor") detects an operation amount (also referred to below as "a BP operation amount") [%] of a brake pedal (not illustrated). The driving operation sensor 58 may include a steering angle sensor and a steering torque sensor (these are not illustrated) and the like.

The vehicle occupant sensor 60 detects information (also referred to below as "vehicle occupant information") about the state (not directly related to a driving operation) of the vehicle occupant. The vehicle occupant sensor 60 includes an interior camera 130 and a seat sensor 132. The interior camera 130 is a driver monitoring camera that captures images of the driver's face and the periphery thereof. The seat sensor 132 is a pressure sensor provided in a seat cushion (not illustrated). The vehicle occupant sensor 60 may also include a seat belt sensor that detects the attachment or detachment of a seat belt (not illustrated).

The first communication device 62 wirelessly communicates with the outside of the vehicle 20. External devices include, for example, the vehicle monitoring server 22 (FIG. 1). Although the first communication device 62 according to the first embodiment is assumed to be installed (or constantly fixed) to the vehicle 20, the first communication device 62 may be a device that can be carried to outside of the vehicle 20, such as, for example, a mobile phone or a smartphone.

The HMI 64 receives an operation input from the vehicle occupant and presents various types of information to the vehicle occupant visually, audibly, and haptically. The HMI 64 includes an automated driving switch 150 (also referred to below as "an automated driving SW 150"), a speaker 152, the touch panel 154, and the microphone 156.

The automated driving SW 150 is a switch that issues commands for the start and stop of automated driving control via an operation by the vehicle occupant. Another method (such as a voice input via the microphone 156) can be used to issue commands for the start and stop of automated driving control in addition to or instead of the automated driving SW 150. The touch panel 154 includes, for example, a liquid crystal panel or an organic electroluminescent (EL) panel.

The driving force output device 66 includes a travel driving source (such as an engine or a travel motor), which is not illustrated, and a driving electronic control unit (referred to below as "a driving ECU"). The driving ECU adjusts the travel driving force of the vehicle 20 by controlling the travel driving source based on the AP operation amount or a command from the AD unit 72.

The braking device 68 includes a brake motor (or a hydraulic mechanism), a brake member, and a braking electronic control unit (referred to below as "a braking ECU"), which are not illustrated. The braking device 68 may control engine braking by an engine and/or regeneration braking by a travel motor. The braking ECU controls the braking force of the vehicle 20 by operating the brake motor or the like based on the BP operation amount or a command from the AD unit 72.

The steering device 70 includes an electric power steering (EPS) motor and an EPS electronic control unit (referred to below as "an EPS ECU"), which are not illustrated. The EPS ECU controls the steering angle of the vehicle 20 by controlling the EPS motor in accordance with the operation of a steering wheel by the driver or a command from the AD unit 72.

The AD unit 72 performs automated driving control for driving the vehicle 20 to the destination without the need for a driving operation (acceleration, deceleration, and steering) performed by the driver, and includes, for example, a central processing unit (CPU). The AD unit 72 includes an input-output device 160, a computation device 162, and a storage device 164.

The input-output device 160 performs inputting and outputting with respect to devices (such as sensors 50, 56, 58, and 60) other than the AD unit 72. The computation device 162 performs computation based on signals from the sensors 50, 56, 58, and 60, the first communication device 62, the HMI 64, and the like. Then, the computation device 162 generates signals for the first communication device 62, the HMI 64, the driving force output device 66, the braking device 68, and the steering device 70 based on the computation result. Details on the computation device 162 will be described later with reference to FIG. 3.

The storage device 164 stores programs and data used by the computation device 162. The storage device 164 includes, for example, a random access memory (referred to below as "a RAM"). A volatile memory such as a register and a non-volatile memory such as a flash memory can be used as the RAM. In addition, the storage device 164 may include a read-only memory (referred to below as "a ROM") in addition to the RAM.

Figure 3:
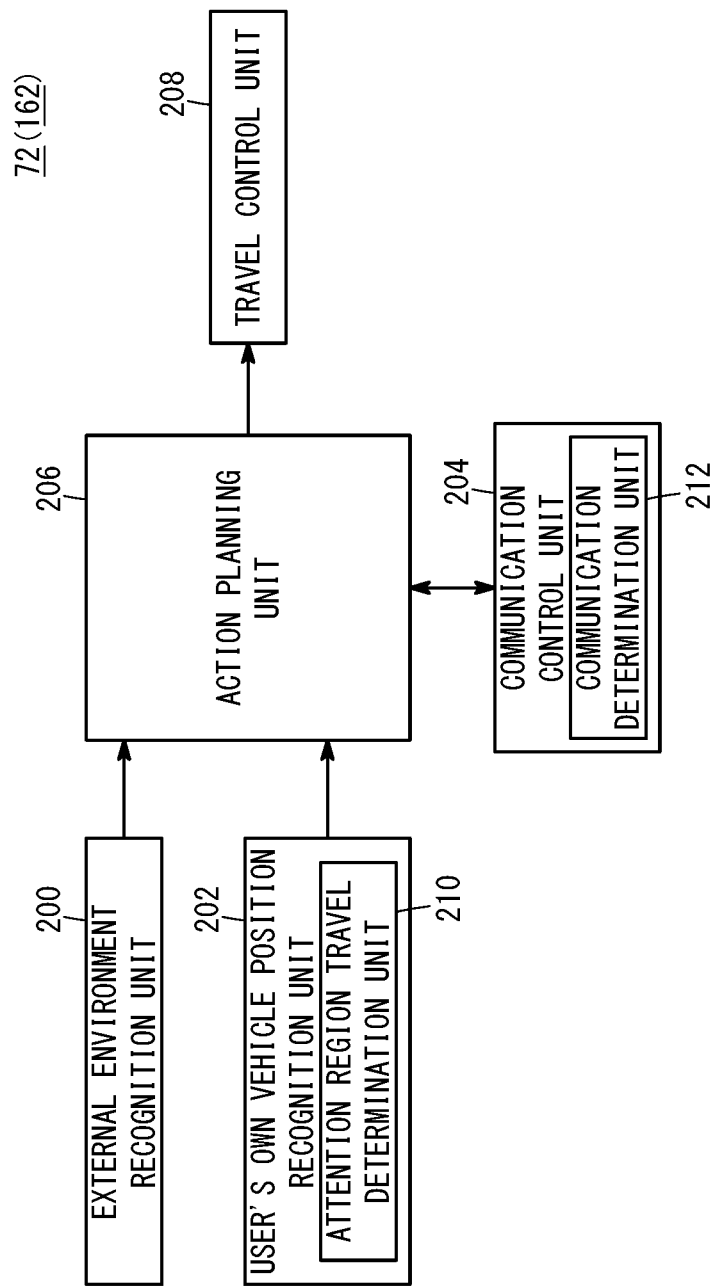
FIG. 3 is a diagram illustrating individual units of a computation device of an automated driving control unit according to the first embodiment.

FIG. 3 is a diagram illustrating individual units of the computation device 162 of the automated driving control unit 72 according to the first embodiment. As illustrated in FIG. 3, the computation device 162 of the AD unit 72 includes an external environment recognition unit 200, a user's own vehicle position recognition unit 202, a communication control unit 204, an action planning unit 206, and a travel control unit 208. These units are achieved by causing the computation device 162 (such as a CPU) to execute programs stored in, for example, the storage device 164 of the AD unit 72. The programs may be supplied by the vehicle monitoring server 22 via the first communication device 62. A part of the programs may be configured by hardware (circuit components).

The external environment recognition unit 200 recognizes situations and objects around the user's own vehicle 20 based on the external environment information from the external environment sensor 50 (FIG. 2). The external environment recognition unit 200 recognizes overall road environments, such as, for example, the road shape, the road width, the position of the lane mark, the number of lanes, the lane width, the lighting state of a traffic light, and the opening or closing state of railroad crossing gates 310*a* to 310*d* (FIG. 4) based on the image information from the exterior cameras 90. The road shape, the road width, the position of a lane mark, the number of lanes, the lane width, and the like may be recognized based on the high-definition map information stored in the map DB 100.

The user's own vehicle position recognition unit 202 recognizes the current position of the user's own vehicle 20 at high accuracy, based on the recognition result by the external environment recognition unit 200, the map information from the MPU 52, and the current position from the navigation device 54. The user's own vehicle position recognition unit 202 includes an attention region travel determination unit 210.

The attention region travel determination unit 210 determines the positional relationship between the user's own vehicle 20 and the travel attention region Ac. The attention region travel determination unit 210 determines whether the user's own vehicle 20 is approaching the travel attention region Ac and whether the user's own vehicle 20 has passed through the travel attention region Ac.

The communication control unit 204 controls communication between the AD unit 72 and an exterior device (for example, the vehicle monitoring server 22). The communication control unit 204 has a communication determination unit 212. The communication determination unit 212 determines whether communication with the vehicle monitoring server 22 has succeeded (details will be described later with reference to FIG. 5).

The action planning unit 206 calculates a target trajectory of the user's own vehicle 20 to the destination input via the HMI 64. Then, the action planning unit 206 judges the travel situation of the user's own vehicle 20 based on the recognition results by the external environment recognition unit 200 and the user's own vehicle position recognition unit 202 and the detection result by the vehicle body behavior sensor 56, updates the target trajectory, and plans various actions of the user's own vehicle 20.

The target route calculated by the navigation device 54 is used to notify the driver of the road to go, and includes only relatively roughly-defined information. In contrast, the target trajectory calculated by the action planning unit 206 includes relatively detailed information for controlling acceleration, deceleration, and steering of the vehicle 20, in addition to roughly-defined information as calculated by the navigation device 54.

The travel control unit 208 calculates and transmits control commands for the driving force output device 66, the braking device 68, and the steering device 70 based on determination results (such as the target trajectory and the target vehicle speed) by the action planning unit 206. In other words, the travel control unit 208 controls the outputs from the actuators that control the behavior of the vehicle body. These actuators include an engine, a brake motor, an electric power steering (EPS) motor, and the like. The travel control unit 208 controls the amount (referred to below as "a vehicle body behavior amount") of behavior of the vehicle 20 (particularly, the vehicle body) by controlling the outputs from the actuators. The vehicle body behavior amount includes, for example, a vehicle speed, a front-rear acceleration, a steering angle, a lateral acceleration, and a yaw rate.

The vehicle monitoring server 22 performs monitoring control for monitoring the vehicle 20 traveling in the travel attention region Ac. As illustrated in FIG. 1, the vehicle monitoring server 22 includes an input-output device 250, a communication device 252 (also referred to below as "a second communication device 252"), a computation device 254, and a storage device 256.

The input-output device 250 performs inputting and outputting with respect to devices (such as the vehicles 20) other than the vehicle monitoring server 22. The second communication device 252 communicates with external devices. The external devices include, for example, the vehicles 20, the electric train management server 24, and the road service management server 28.

The computation device 254 performs computation based on signals from the vehicles 20 and the like. Then, the computation device 254 generates signals for the vehicles 20, the electric train management server 24, and the road service management server 28 based on the computation results. Details on monitoring control performed by the computation device 254 will be described later with reference to FIG. 7.

The storage device 256 stores the programs and data used by the computation device 254. The storage device 256 has a map database 260 (also referred to below as "a map DB 260" or "a second map DB 260").

The electric train management server 24 is installed by a railroad company and manages operation of the electric trains 26. The electric train management server 24 includes an input-output device, a communication device, a computation device, and a storage device (these are not illustrated). The electric train management server 24 acquires, from the electric trains 26, current position information about the current positions of the electric trains 26 via the communication network 32 and uses the acquired current position information to manage the electric trains 26.

When receiving, from the vehicle monitoring server 22, an urgent signal indicating that a particular vehicle 20 remains in the railroad crossing 300 (travel attention region Ac) for an excessively long time, the electric train management server 24 brings, to an emergency stop, the electric trains 26 around the railroad crossing 300 in which the particular vehicle 20 remains.

The road service management server 28 manages the schedules of the road service vehicles 30. The road service management server 28 includes an input-output device, a communication device, a computation device, and a storage device (these are not illustrated). When receiving, from the vehicle monitoring server 22, the urgent signal indicating that a particular vehicle 20 remains on a snowy road (travel attention region Ac) for an excessively long time, the road service management server 28 requests the road service vehicle 30 at the periphery of the point at which the particular vehicle 20 remains, to go to that point.

Figure 4:
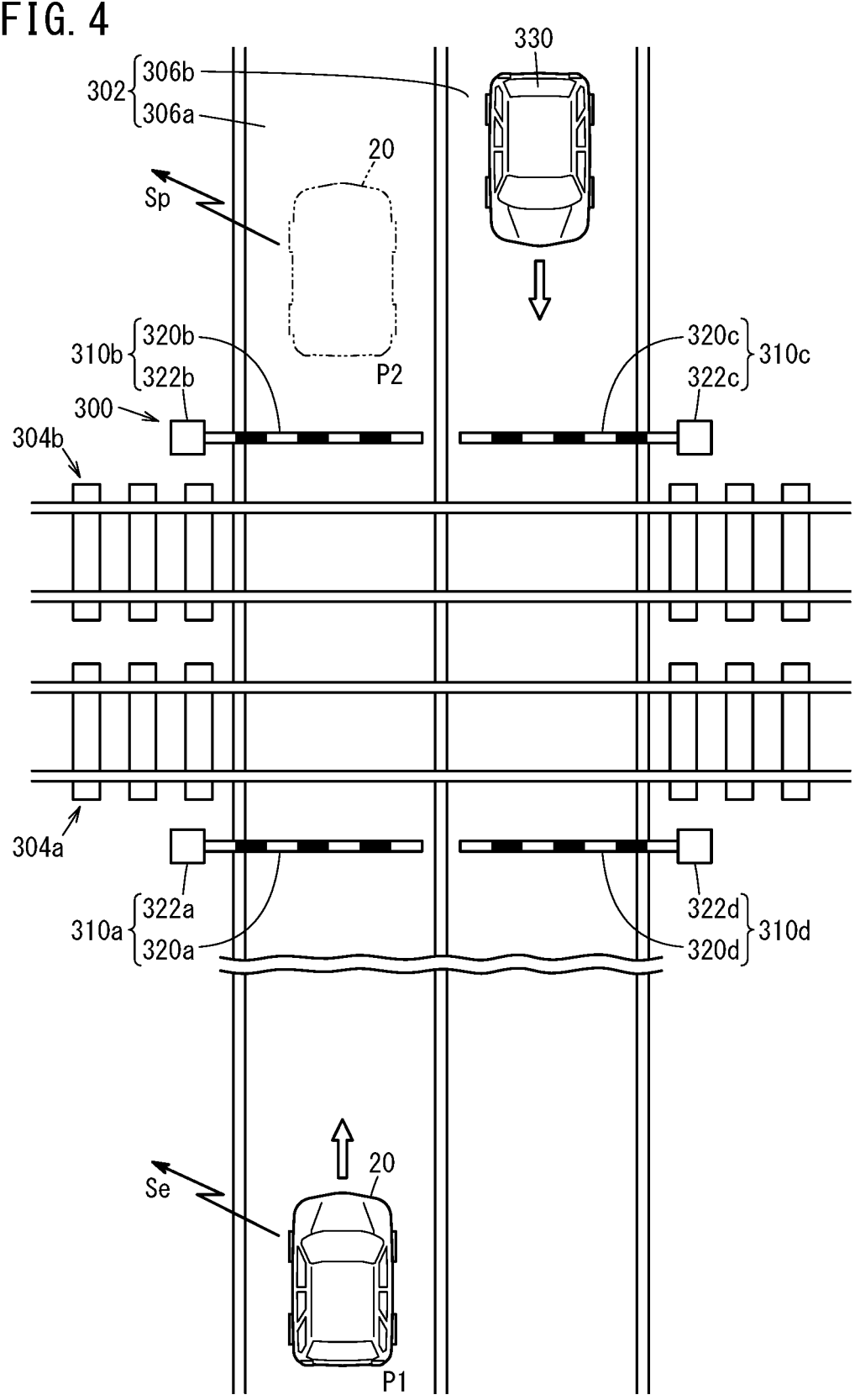
FIG. 4 is a diagram simply illustrating operation of the vehicle and the like according to the first embodiment.

FIG. 4 is a diagram simply illustrating the operation of the vehicles 20 and the like according to the first embodiment. In FIG. 4, the railroad crossing 300 is present in front of the user's own vehicle 20, which is at point P1. At the railroad crossing 300, a two-lane road 302 intersects with two railway tracks 304*a* and 304*b*.

In the first embodiment, an example is shown in which the vehicle 20 travels on the left side. With respect to the vehicle 20, a left lane 306*a* is a travel lane and a right lane 306*b* is an opposite lane.

The railroad crossing 300 is provided with first to fourth railroad crossing gates 310*a* to 310*d* (also referred to below as "crossing gates 310*a* to 310*d*" and collectively referred to as "railroad crossing gates 310" or "crossing gates 310"). When the railroad crossing 300 is viewed from the vehicle 20 (point P1) that will cross the railroad crossing 300, the crossing gate 310*a* that is located in front of the railway tracks 304*a* and 304*b* is also referred to as an entrance-side crossing gate, and the crossing gate 310*b* that is located in back of the railway tracks 304*a* and 304*b* is also referred to as an exit-side crossing gate. As viewed from another vehicle 330 that travels on the opposite lane 306*b*, a third crossing gate 310*c* is an entrance-side crossing gate and a fourth crossing gate 310*d* is an exit-side crossing gate.

The crossing gates 310*a* to 310*d* have crossing bars 320*a* to 320*d* and main bodies 322*a* to 322*d* as mechanisms for moving up and down the crossing bars 320*a* to 320*d*, respectively.

Generally, when the vehicle 20 passes through the railroad crossing 300 in a state that the railroad crossing gates 310 do not interrupt the traffic on the road 302, the vehicle 20 first stops temporarily before the entrance-side crossing gate 310*a*. Then, the vehicle 20 passes through the railroad crossing 300 at slow speed.

As illustrated in FIG. 4, when the vehicle 20 approaches the railroad crossing 300 (travel attention region Ac) (point P1), the vehicle 20 transmits an entry notice signal Se to the vehicle monitoring server 22. The vehicle monitoring server 22 having received the entry notice signal Se monitors whether the vehicle 20 has passed through the railroad crossing 300 in safety. After that, when the vehicle 20 has passed through the railroad crossing 300 (point P2), the vehicle 20 transmits a pass completion signal Sp to the vehicle monitoring server 22. The vehicle monitoring server 22 having received the pass completion signal Sp ends the monitoring described above.

When not receiving the pass completion signal Sp within a second predetermined time (a count threshold described later) even through the vehicle monitoring server 22 has received the entry notice signal Se, the vehicle monitoring server 22 executes abnormal-time processing that notifies the electric train management server 24 of an abnormal situation.

Figure 5:
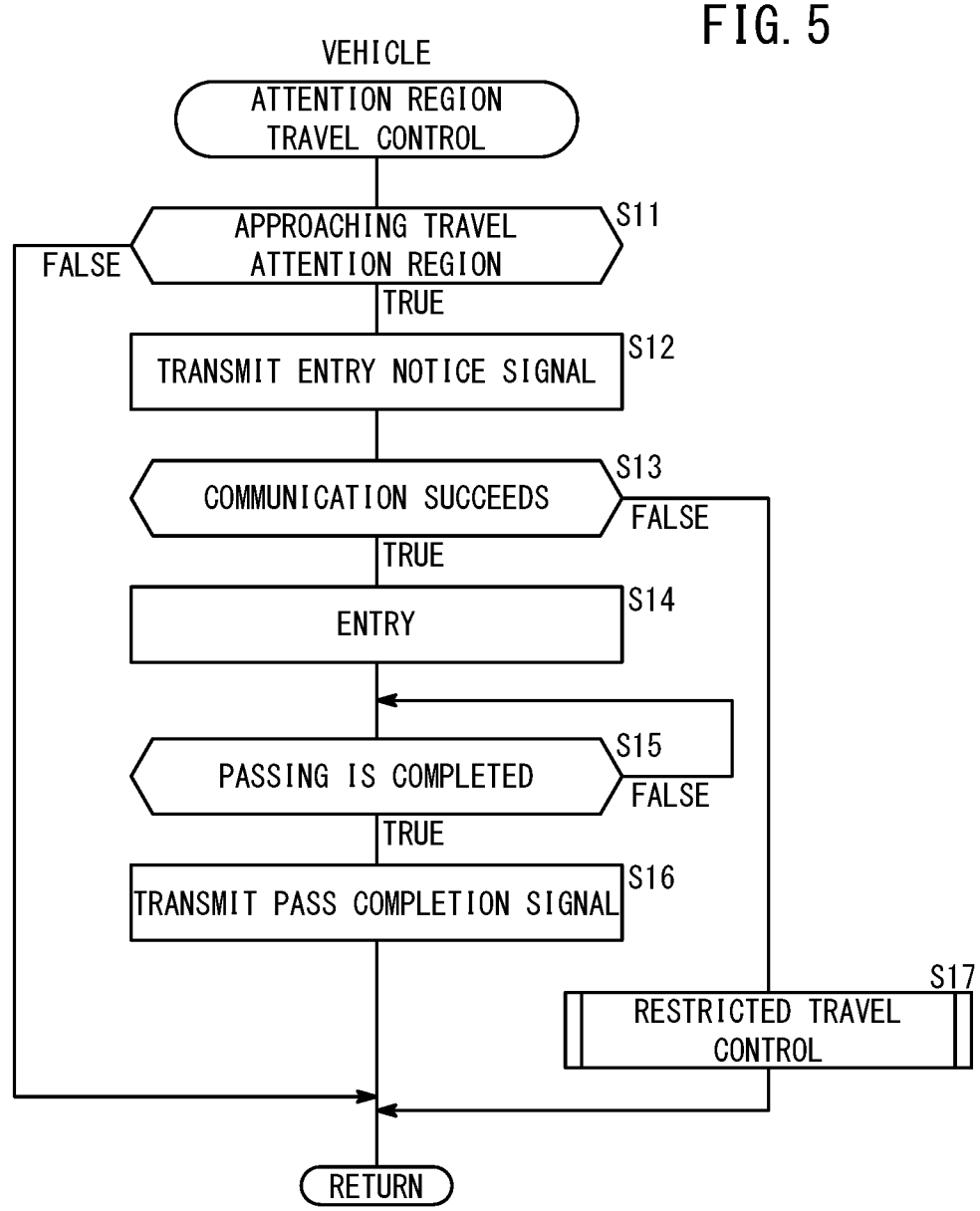
FIG. 5 is a flowchart illustrating attention region travel control performed by the vehicle in the first embodiment.

FIG. 5 is a flowchart illustrating attention region travel control performed by the vehicle 20 in the first embodiment. In step S11, the AD unit 72 determines whether the vehicle 20 is approaching the travel attention region Ac. The travel attention region Ac is a region in which the vehicle 20 needs to travel carefully, and includes, for example, the railroad crossing 300 and a snowy road. Regarding the railroad crossing 300, all types of the railroad crossing 300 do not necessarily need to be included in the travel attention region Ac, and only particular types of the railroad crossing 300 may be included in the travel attention region Ac. Details on a determination as to whether the vehicle 20 is approaching the travel attention region Ac will be described later.

When the vehicle 20 is approaching the travel attention region Ac (TRUE in S11), the processing proceeds to step S12. When the vehicle 20 is not approaching the travel attention region Ac (FALSE in S11), this process ends, and the processing returns to step S11 after a lapse of a predetermined time.

In step S12, the AD unit 72 transmits the entry notice signal Se to the vehicle monitoring server 22 via the first communication device 62. The entry notice signal Se is the signal indicating that the vehicle 20 is approaching the travel attention region Ac. The entry notice signal Se includes the current position of the vehicle 20. When there are a plurality of types of travel attention regions Ac, the entry notice signal Se may also include the type of the travel attention region Ac. Alternatively, the vehicle monitoring server 22 may identify the travel attention region Ac by searching the second map DB 260 for the travel attention region Ac corresponding to the current position included in the entry notice signal Se.

In step S13, the AD unit 72 determines whether communication with the vehicle monitoring server 22 has succeeded within the count threshold, in other words, whether the entry notice signal Se has been transmitted normally within the count threshold. This determination is made by checking whether an acknowledgement signal from the vehicle monitoring server 22 has been received. When communication with the vehicle monitoring server 22 has succeeded (TRUE in S13), the processing proceeds to step S14.

In step S14, the AD unit 72 permits the user's own vehicle 20 to enter the travel attention region Ac and actually causes the user's own vehicle 20 to enter the travel attention region Ac by automated driving control. In step S15, the AD unit 72 determines whether the user's own vehicle 20 has passed through the travel attention region Ac. Details on this determination will be described later. When passing through the travel attention region Ac has been completed (TRUE in S15), the processing proceeds to step S16. When passing through the travel attention region Ac has not been completed (FALSE in S15), step S15 is repeated.

In step S16, the AD unit 72 transmits the pass completion signal Sp to the vehicle monitoring server 22 via the first communication device 62. The pass completion signal Sp is a signal indicating that the user's own vehicle 20 has passed through the travel attention region Ac. Upon completion of step S16, this process ends and the processing returns to step S11 after a lapse of a predetermined time.

The processing returns to step S13. When communication with the vehicle monitoring server 22 does not succeed within the count threshold (in other words, by the first predetermined point of time) (FALSE in S13), the AD unit 72 performs restricted travel control for restricting the traveling of the user's own vehicle 20 in step S17. The restricted travel control will be described later with reference to FIG. 6.

As described above, the travel attention region Ac is a region in which the vehicle 20 needs to travel carefully and includes, for example, the railroad crossing 300, a snowy road, an intersection, and an electric tramway travel area. The details of the travel attention region Ac are preset in the storage device 164 of the AD unit 72.

The position of the railroad crossing 300 is determined based on, for example, the image information (front image) from the exterior cameras 90 or the map information of the map DB 100. Specifically, the AD unit 72 determines whether the image information (front image) contains therein a pattern corresponding to the entrance-side crossing gate 310a of the railroad crossing 300, by using pattern matching. If the pattern corresponding to the entrance-side crossing gate 310a is found via the pattern matching, the AD unit 72 determines that the position of the pattern is the position of the entrance-side crossing gate 310a. In addition, the map information includes the position information of the railroad crossing 300.

A determination as to whether the user's own vehicle 20 is approaching the travel attention region Ac is made by, for example, checking whether a distance from the current position of the user's own vehicle 20 to the railroad crossing 300≤a distance threshold. The distance to the railroad crossing 300 is calculated based on a predetermined first reference position. The first reference position is, for example, the position of the entrance-side crossing gate 310a.

Alternatively, a determination as to whether the user's own vehicle 20 is approaching the travel attention region Ac is made by checking whether an estimated time required for the user's own vehicle 20 to reach the railroad crossing 300 or reach a second reference position determined based on the railroad crossing 300≤a time threshold.

A determination (S15 in FIG. 5) as to whether passing through the travel attention region Ac has been completed is made based on, for example, the image information captured by the exterior cameras 90 or the map information of the map DB 100. Specifically, the AD unit 72 determines whether the image information contains therein a pattern corresponding to the exit-side crossing gate 310b by using pattern matching. If the pattern corresponding to the exit-side crossing gate 310b is found via the pattern matching, the AD unit 72 determines that passing through the travel attention region Ac has been completed when the user's own vehicle 20 has passed through the position of the pattern. In addition, when the current position of the user's own vehicle 20 has gone ahead of the position of the exit-side crossing gate 310b on the target trajectory, the AD unit 72 determines that passing through the travel attention region Ac has been completed.

Figure 6:
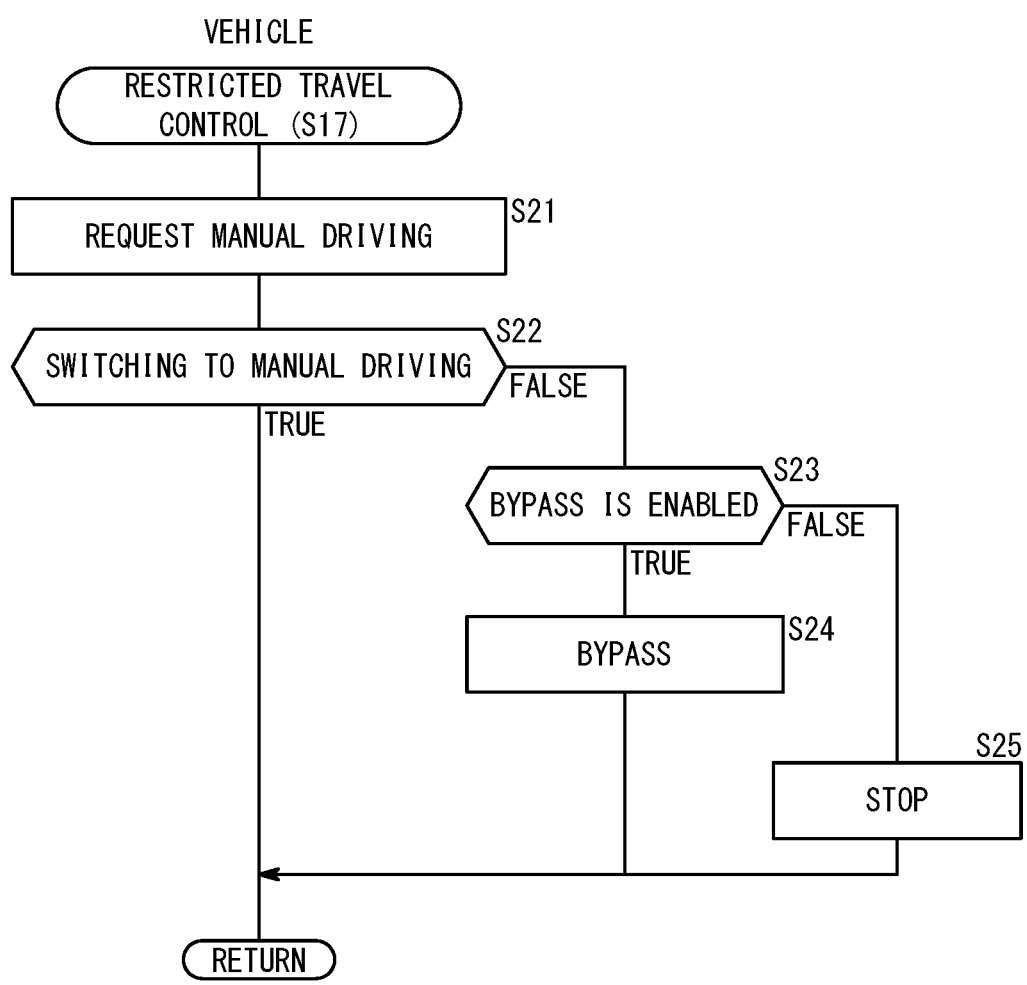
FIG. 6 is a flowchart (detail in S17 in FIG. 5) illustrating restricted travel control performed by the vehicle in the first embodiment.

FIG. 6 is a flowchart illustrating restricted travel control performed by the vehicle 20 in the first embodiment (detail in S17 in FIG. 5). As described above, restricted travel control is performed when communication with the vehicle monitoring server 22 does not succeed (FALSE in S13 in FIG. 5) even though the vehicle 20 is approaching the travel attention region Ac.

In step S21, the AD unit 72 requests the vehicle occupant to perform manual driving via the HMI 64. For example, a particular sound is output via the speaker 152. In addition to this or instead of this, the touch panel 154 displays thereon a message indicating that manual driving should be performed.

In step S22, the AD unit 72 determines whether switching to manual driving has been performed within a predetermined time. The determination can be made based on, for example, the presence or absence of contact with the steering touch sensor 122. Alternatively, the determination can also be made based on the presence or absence of depression of the accelerator pedal. Alternatively, the determination can also be made by checking whether the steering torque detected by the steering torque sensor a torque threshold. When switching to manual driving has been performed within the predetermined time (TRUE in S22), this process ends. When switching to manual driving has not been performed within the predetermined time (FALSE in S22), the processing proceeds to step S23.

In step S23, the AD unit 72 determines whether it is possible to bypass the travel attention region Ac, by referring to the map information. When it is possible to bypass the travel attention region Ac (TRUE in S23), the AD unit 72 changes the target trajectory so as to bypass the travel attention region Ac in step S24. When it is not possible to bypass the travel attention region Ac (FALSE in S23), the AD unit 72 causes the vehicle 20 to stop on, for example, a side strip or the like in front of the travel attention region Ac in step S25.

Figure 7:
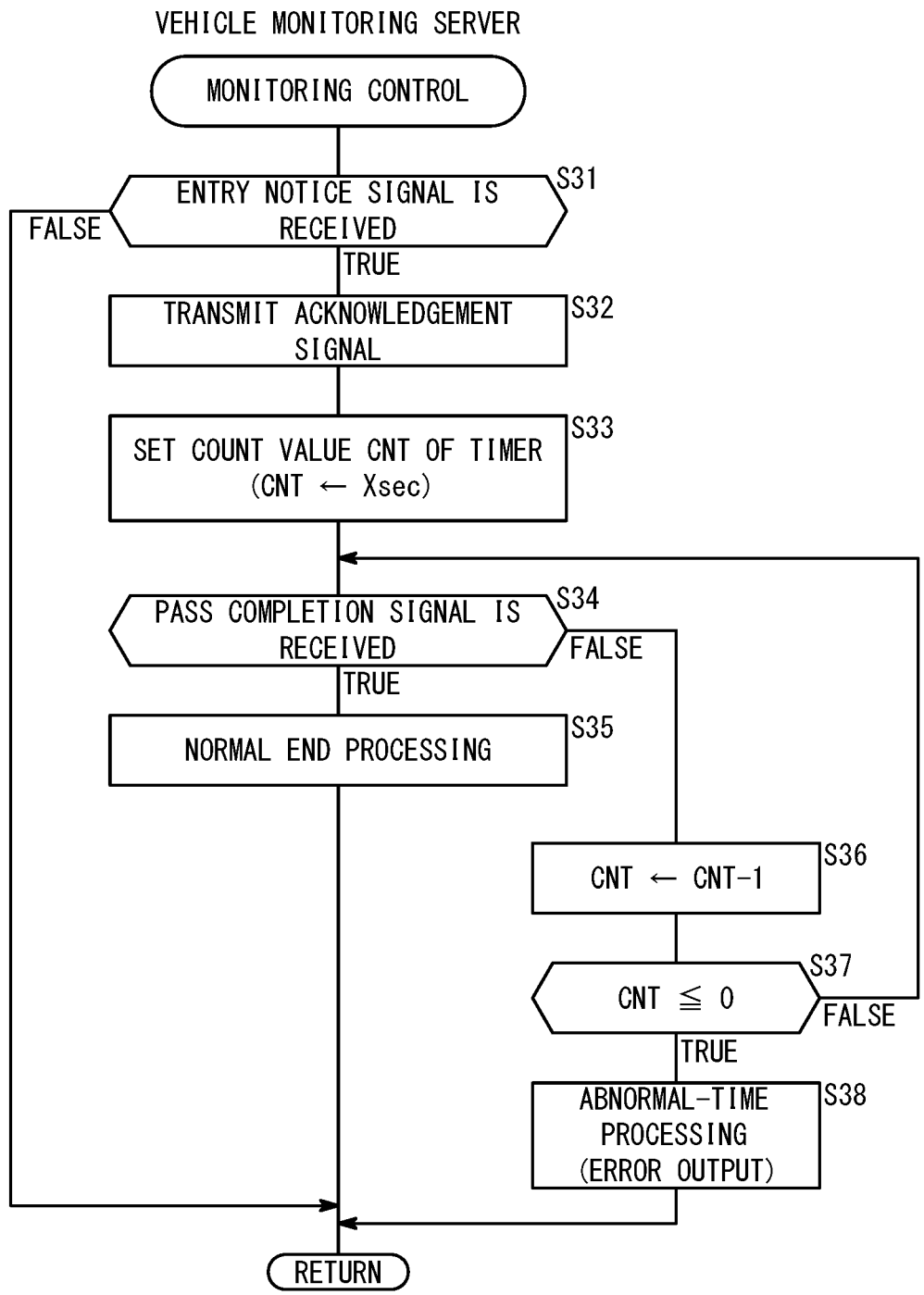
FIG. 7 is a flowchart illustrating monitoring control performed by a vehicle monitoring server in the first embodiment.

FIG. 7 is a flowchart illustrating monitoring control performed by the vehicle monitoring server 22 in the first embodiment. As described above, monitoring control monitors the vehicle 20 that travels in the travel attention region Ac. In step S31 in FIG. 7, the vehicle monitoring server 22 determines whether the entry notice signal Se has been received from any of the vehicles 20. When the entry notice signal Se has been received (TRUE in S31), the processing proceeds to step S32. When the entry notice signal Se has not been received (FALSE in S31), this process ends and the processing returns to step S31 after a lapse of a predetermined time.

In step S32, the vehicle monitoring server 22 transmits the acknowledgement signal to the vehicle 20 (also referred to below as "the target vehicle) having transmitted the entry notice signal Se. In step S33, the vehicle monitoring server 22 sets the initial value of a count value CNT of a timer to, for example, X seconds. The initial value is set to a value acquired by adding a margin value to a time required for the vehicle 20 to pass through the travel attention region Ac. The initial value may be set to a different value depending on the type of the travel attention region Ac.

In step S34, the vehicle monitoring server 22 determines whether the pass completion signal Sp has been received from the target vehicle When the pass completion signal Sp has been received (TRUE in S34), the vehicle monitoring server 22 performs normal end processing in step S35. In the normal end processing, the resetting of the timer and the like are performed. When the pass completion signal Sp has not been received (FALSE in S34), the processing proceeds to step S36.

In step S36, the vehicle monitoring server 22 decrements the count value CNT of the timer by 1. In step S37, the vehicle monitoring server 22 determines whether or not the count value CNT≤zero. In step S37, the count threshold may be non-zero. When the count value CNT exceeds zero (FALSE in S37), the processing returns to step S34. When the count value CNT≤zero (TRUE in S37), in other words, when the second predetermined point of time is reached, the processing proceeds to step S38.

In step S38, the vehicle monitoring server 22 performs abnormal-time processing (error output). When the travel attention region Ac is the railroad crossing 300 in abnormal-time processing, the vehicle monitoring server 22 transmits the urgent signal to the electric train management server 24. The electric train management server 24 having received the urgent signal outputs an urgent stop signal to the electric trains 26 around the target vehicle via the communication network 32. The electric trains 26 having received the urgent stop signal perform an urgent stop.

In addition, when the travel attention region Ac is a snowy road, the vehicle monitoring server 22 transmits the urgent signal to the road service management server 28. The road service management server 28 having received the urgent signal outputs an urgent signal to the road service vehicles 30 around the target vehicle via the communication network 32. The road service vehicles 30 having received the urgent signal for example, displays the current position of the target vehicle on a display device (not illustrated). The road service personnel having confirmed this display or the like moves to the current position of the target vehicle using the road service vehicle 30 and takes appropriate measures depending on the situation of the target vehicle.

As described above, according to the first embodiment, before the vehicle 20 enters the travel attention region Ac (TRUE in S11 in FIG. 5), the entry notice signal Se is transmitted to the vehicle monitoring server 22 (S12). Owing thereto, in the configuration in which the vehicle monitoring server 22 having received the entry notice signal Se transmits the acknowledgement signal to, for example, the vehicle 20, the vehicle 20 can confirm that the first communication device 62 operates normally. In addition, the vehicle monitoring server 22 having received the entry notice signal Se can recognize that the vehicle 20 has started entering the travel attention region Ac. As a result, for example, the vehicle monitoring server 22 can focus on the monitoring of the vehicle 20 having started entering the travel attention region Ac. Thus, the embodiment can be preferably applied to the configuration in which the vehicle 20 communicates with the vehicle monitoring server 22 in association with the travel attention region Ac.

In the first embodiment, on condition that communication with the vehicle monitoring server 22 has succeeded (TRUE in S13 in FIG. 5), in other words, on condition that the entry notice signal Se has been transmitted normally, the AD unit 72 (first control device) permits the vehicle 20 to enter the travel attention region Ac (S14). This makes it possible to confirm that transmission of the entry notice signal Se has been completed normally.

In the first embodiment, when the entry notice signal Se has not been transmitted normally (FALSE in S13 in FIG. 5), the AD unit 72 (first control device) causes the vehicle 20 to bypass the travel attention region (S24 in FIG. 6), in other words, prohibits the vehicle 20 from entering the travel attention region Ac. Alternatively, the AD unit 72 permits the vehicle 20 to enter the travel attention region Ac on condition of switching to manual driving (TRUE in S22 in FIG. 6) (predetermined travel restriction). This makes it possible to take appropriate measures when the entry notice signal Se has not been transmitted normally.

In the first embodiment, the AD unit 72 (first control device) determines whether the vehicle 20 has passed through the travel attention region Ac based on the external environment information (surrounding environment information) (S15 in FIG. 5). When determining that the vehicle 20 has passed through the travel attention region Ac (TRUE in S15), the AD unit 72 transmits the pass completion signal Sp to the vehicle monitoring server 22 via the first communication device 62 (S16).

According to the first embodiment, when the vehicle 20 has passed through the travel attention region Ac, the pass completion signal Sp is transmitted to the vehicle monitoring server 22. This enables the vehicle monitoring server 22 having received the pass completion signal Sp to recognize that the vehicle 20 has passed through the travel attention region Ac. Accordingly, the vehicle monitoring server 22 can relax the monitoring of, for example, the vehicle 20 that entered the travel attention region Ac earlier.

The travel attention region Ac in the first embodiment includes the railroad crossing 300 (FIG. 4). This enables the vehicle monitoring server 22 having received the entry notice signal Se to recognize that the vehicle 20 starts entering the railroad crossing 300. Accordingly, for example, the vehicle monitoring server 22 can focus on the monitoring of the vehicle 20 having started entering the railroad crossing 300.

In the first embodiment, when the AD unit 72 (first control device) does not receive the acknowledgement signal from the vehicle monitoring server 22 within the count threshold (in other words, by the first predetermined point of time) after the entry notice signal Se has been transmitted (FALSE in S13 in FIG. 5), the AD unit 72 (first control device) determines that transmission of the entry notice signal Se has not been completed normally. This makes it possible to permit a normal travel in the travel attention region Ac by confirming that communication with the vehicle monitoring server 22 has succeeded.

According to the first embodiment, when the vehicle monitoring server 22 does not receive the pass completion signal Sp by a time when reaching the point of time (second predetermined point of time) at which the count value CNT becomes zero or less, after the entry notice signal Se has been received from the target vehicle (particular vehicle) (TRUE in S37 in FIG. 7), the vehicle monitoring server 22 performs an error output (S38). This makes it possible to address the situation in which the vehicle 20 remains in the travel attention region Ac.

B. Second Embodiment

The configuration of a second embodiment is the same as in the first embodiment (FIGS. 1 to 3). Accordingly, the same components are denoted by the same reference numerals and details descriptions are omitted. In the second embodiment, the AD unit 72 according to the second embodiment performs attention region travel control using the vehicle occupant information Io detected by the vehicle occupant sensor 60.

Figure 8:
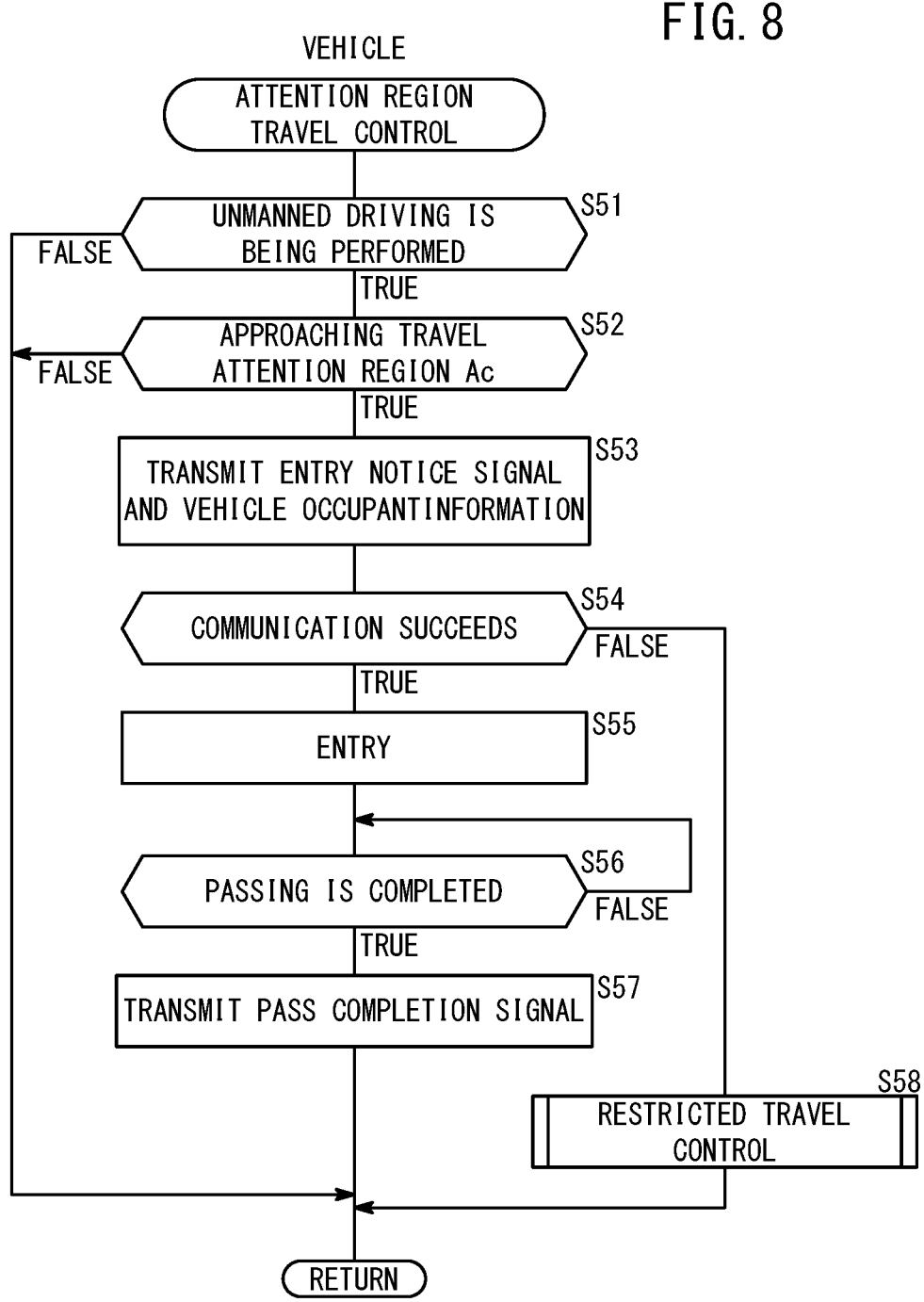
FIG. 8 is a flowchart illustrating attention region travel control performed by a vehicle in a second embodiment.

FIG. 8 is a flowchart illustrating attention region travel control performed by the vehicle 20 in the second embodiment. In step S51, the AD unit 72 determines whether unmanned driving is being performed in the vehicle 20. This determination is made based on, for example, an interior image from the interior camera 130 (driver monitoring camera) as the vehicle occupant sensor 60.

Specifically, when the interior image includes an image of a vehicle occupant (driver), the AD unit 72 determines that manned driving is being performed. When the interior image does not include an image of a vehicle occupant (driver), the AD unit 72 determines that unmanned driving is being performed. Accordingly, when a vehicle occupant is not present in the driver seat even though a vehicle occupant is present in the front passenger seat, the rear seat, or the like, the AD unit 72 determines that unmanned driving is being performed. Alternatively, the presence or absence of a vehicle occupant in the front passenger seat, the rear seat, and the like may be determined by providing the interior cameras 130 for these seats.

Alternatively, a determination as to whether unmanned driving is being performed in the vehicle 20 may be made by using the seat sensor 132 as the vehicle occupant sensor 60. In this case, the seats in which vehicle occupants sit can be determined based on the detection values of the seat sensors 132 of individual seats.

When unmanned driving is being performed (TRUE in S51), the processing proceeds to step S52. When unmanned driving is not being performed (FALSE in S51), this process ends and the processing returns to step S51 after a lapse of a predetermined time.

In step S52, the AD unit 72 determines whether the vehicle 20 is approaching the travel attention region Ac. This determination is the same as in step S11 in FIG. 5. When the vehicle 20 is approaching the travel attention region Ac (TRUE in S52), the processing proceeds to step S53. When the vehicle 20 is not approaching the travel attention region Ac (FALSE in S52), this process ends and the processing returns to step S51 after a lapse of a predetermined time.

In step S53, the AD unit 72 transmits the entry notice signal Se and the vehicle occupant information to the vehicle monitoring server 22 via the first communication device 62. The vehicle occupant information is information concerning vehicle occupants present in the user's own vehicle 20. The vehicle occupant information includes, for example, information indicating a manned or unmanned state.

Steps S54 to S58 are the same as steps S13 to S17 in FIG. 5. In the restricted travel control in step S58, however, only steps S23 to S25 may be executed while omitting steps S21 and S22 in FIG. 6.

According to the second embodiment described above, the following effect can be acquired in addition to or instead of the effect of the first embodiment.

That is, in the second embodiment, when the travel attention region Ac is included in the target trajectory of the vehicle 20 (TRUE in S52 in FIG. 8), the AD unit 72 (first control device) transmits the vehicle occupant information indicating a manned or unmanned state, in addition to the entry notice signal Se, to the vehicle monitoring server 22 (S53). This enables the vehicle monitoring server 22 to determine whether the vehicle 20 is in a manned or unmanned state and take measures appropriate for this state. For example, when transmitting the urgent signal to the electric train management server 24, it is possible to cause the urgent signal to include the vehicle occupant information. This enables the presence or absence of vehicle occupants in the vehicle 20 to be shared with the electric train management server 24.

C. Third Embodiment

The configuration of a third embodiment is the same as in the first embodiment (FIGS. 1 to 3). In the following description, the same components as in the first embodiment are denoted by the same reference numerals and specific descriptions are omitted. In the first embodiment, the agent of action that determines whether the vehicle 20 is approaching the travel attention region Ac is the AD unit 72 of the vehicle 20 (S11 in FIG. 5). This is also true of the second embodiment (S52 in FIG. 8). In contrast, in the third embodiment, the agent of action that determines whether the vehicle 20 is approaching the travel attention region Ac is the vehicle monitoring server 22 (FIG. 1).

The vehicle 20 according to the third embodiment transmits the current position of the user's own vehicle 20 to the vehicle monitoring server 22 via the first communication device 62 each time a predetermined condition is met. The predetermined condition may be, for example, "every predetermined period" (for example, every several seconds) or "every predetermined distance" (for example, every 10 meters).

Figure 9:
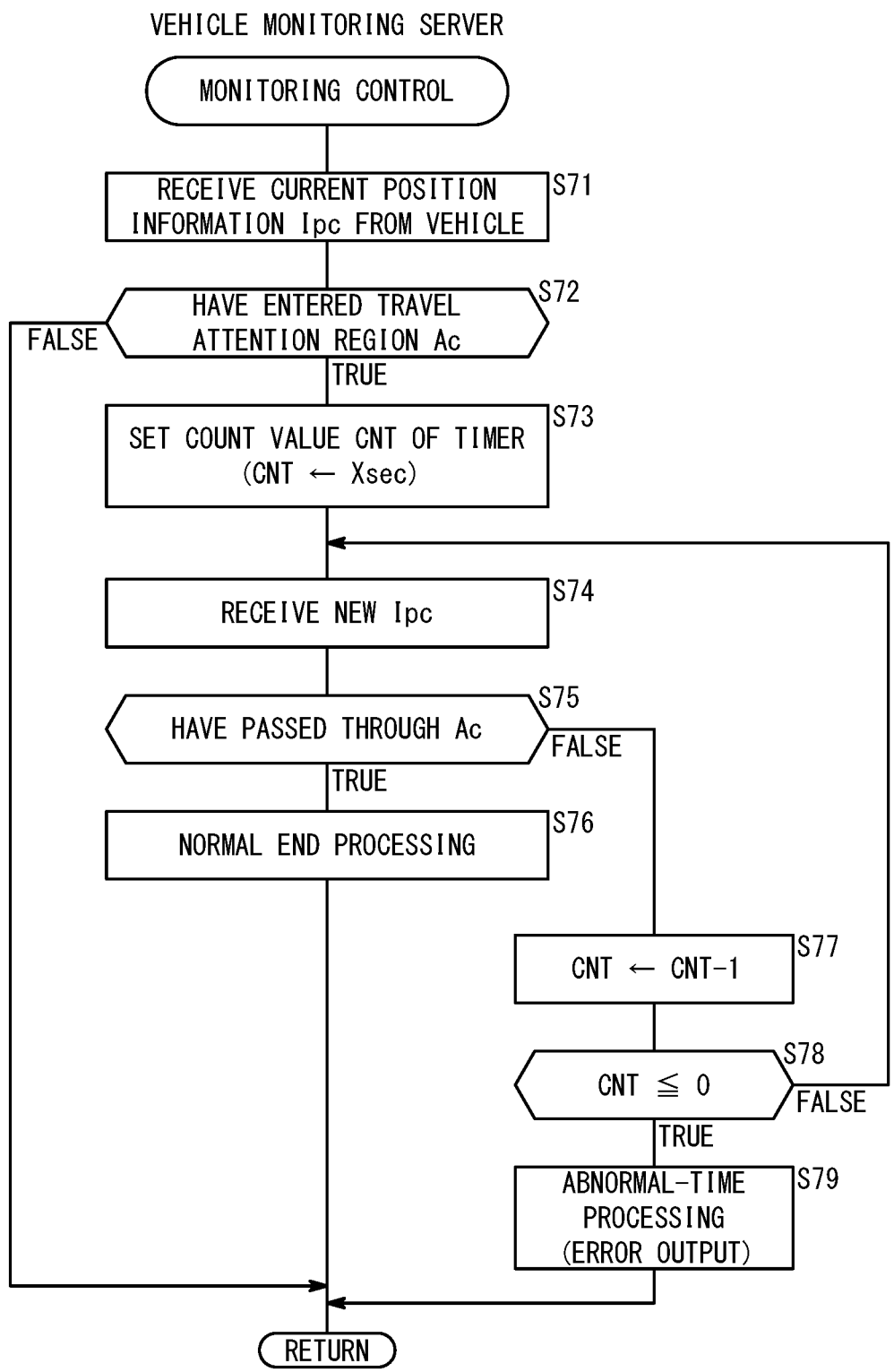
FIG. 9 is a flowchart illustrating monitoring control performed by a vehicle monitoring server in a third embodiment.

FIG. 9 is a flowchart illustrating monitoring control performed by the vehicle monitoring server 22 in the third embodiment. As described above, monitoring control monitors the vehicle 20 that travels in the travel attention region Ac. The flowchart in FIG. 9 is executed for each vehicle 20.

In step S71 in FIG. 9, the vehicle monitoring server 22 receives the current position information Ipc from the vehicle 20 to be monitored. In step S72, the vehicle monitoring server 22 determines whether the vehicle 20 to be monitored has entered the travel attention region Ac. In this determination, the map information of the second map DB 260 is used to know the position of the travel attention region Ac. When the vehicle 20 to be monitored has entered the travel attention region Ac (TRUE in S72), the processing proceeds to step S73. When the vehicle 20 to be monitored has not entered the travel attention region Ac (FALSE in S72), this process ends and the processing returns to step S71 after a lapse of a predetermined time.

In step S73, the vehicle monitoring server 22 sets the count value CNT of the timer to, for example, X seconds. In step S74, the vehicle monitoring server 22 receives new current position information from the target vehicle. In step S75, the vehicle monitoring server 22 determines whether the target vehicle has passed through the travel attention region Ac.

When the target vehicle has passed through the travel attention region Ac (TRUE in S75), the vehicle monitoring server 22 performs normal end processing in step S76. The normal end processing performs a reset of the timer and the like. When the target vehicle has not passed through the travel attention region Ac (FALSE in S75), the processing proceeds to step S77.

Steps S77 to S79 are the same as steps S36 to S38 in FIG. 7.

According to the third embodiment described above, the following effect can be acquired in addition to or instead of the effects of the first and second embodiments.

That is, in the third embodiment, the GPS sensor 110 (position sensor) (FIG. 2) of the vehicle 20 detects the current position of the vehicle 20. The AD unit 72 (first control device) of the vehicle 20 transmits the current position or the current position information of the vehicle 20 to the vehicle monitoring server 22 via the first communication device 62. The computation device 254 (second control device) of the vehicle monitoring server 22 presets the travel attention region Ac. In addition, the computation device 254 monitors the current positions from the plurality of vehicles 20 via the second communication device 252 (S71 and S72 in FIG. 9). After having entered the travel attention region Ac (TRUE in S72), when the particular vehicle 20 has not passed through the travel attention region Ac (TRUE in S78) by a time when the point of time (third predetermined point of time) at which the count value CNT becomes zero or less is reached, an error output is performed (S79).

According to the third embodiment, after having entered the travel attention region Ac, when the particular vehicle 20 has not passed through the travel attention region Ac by a time when the point of time (third predetermined point of time) at which the count value CNT becomes equal to or less than the count threshold, the vehicle monitoring server 22 performs an error output. With this configuration, it is possible to address an abnormal situation earlier in a case that a particular vehicle 20 remains in the travel attention region Ac.

D. Modifications

The present invention is not limited to the embodiments described above and it will be appreciated that various configurations can be adopted based on the description of this specification. For example, the following configuration can be adopted.

In the first embodiment, the vehicle monitoring system 10 includes the vehicles 20, the vehicle monitoring server 22, the electric train management server 24, the electric trains 26, the road service management server 28, and the road service vehicles 30 (FIG. 1). However, the present invention is not limited to this example in terms of, for example, the monitoring of the vehicle 20 that enters the travel attention region Ac using the entry notice signal Se. For example, in the monitoring system 10, one of the combination of the electric train management server 24 and the electric trains 26 and the combination of the road service management server 28 and the road service vehicles 30 can be omitted. This is also true of the second and third embodiments.

In the first embodiment, the monitoring target by the vehicle monitoring server 22 is assumed to be the vehicle 20 that is a passenger vehicle (see FIG. 1). However, the present invention is not limited to this example in terms of, for example, the monitoring of the vehicle 20 that enters the travel attention region Ac using the entry notice signal Se. For example, the monitoring target by the monitoring system 10 may be vehicles (or mobile objects) such as the electric trains 26, ships, airplanes. This is also true of the second and third embodiments.

The vehicle 20 (AD unit 72) according to the first embodiment performs automated driving control for driving the vehicle 20 to the destination without the need for driving operations (acceleration, deceleration, and steering) by the driver (see FIG. 2 and FIG. 3). However, the present invention is not limited to this example in terms of, for example, the monitoring of the vehicle 20 that enters the travel attention region Ac using the entry notice signal Se. The present invention is also applicable to, for example, the vehicle 20 that performs automated driving control for automatically performing only acceleration and deceleration or steering. This is also true of the second and third embodiments.

In the attention region travel control according to the first embodiment, the travel attention region Ac refers to the railroad crossing 300 and the snowy road (S11 in FIG. 5). However, the present invention is not limited to this example in terms of, for example, the monitoring of the vehicle 20 that enters the travel attention region Ac using the entry notice signal Se. For example, the travel attention region Ac may be only one of the railroad crossing 300 and the snowy road. Alternatively, the travel attention region Ac can include an intersection and/or an electric tramway travel area. Regarding the intersections, all the intersections do not necessarily need to be included in the travel attention region Ac, and only particular types of the intersection may be included in the travel attention region Ac. This is also true of the second and third embodiments.

The attention region travel control according to the first embodiment determines approaching and passing through the travel attention region Ac by using both the external environment information from the external environment sensor 50 and the combination of the current position information from the GPS sensor 110 and the map information from the map DB 100 (S11 and S15 in FIG. 5). However, the present invention is not limited to this example in terms of, for example, the determination of the travel attention region Ac based on surrounding environment information (such as the external environment information, the current position information, and the map information) about the surrounding environment of the vehicle 20. For example, the travel attention region Ac may be determined by using only the external environment information from the external environment sensor 50 or by using only the combination of the current position information from the GPS sensor 110 and the map information from the map DB 100.

The attention region travel control according to the first embodiment uses both the entry notice signal Se and the pass completion signal Sp (S12 and S16 in FIG. 5). However, the present invention is not limited to this example in terms of, for example, the monitoring of the vehicle 20 that enters the travel attention region Ac using the entry notice signal Se. The pass completion signal Sp does not necessarily need to be transmitted. This is also true of the second embodiment The entry notice signal Se used for the attention region travel control according to the first embodiment is assumed to be a dedicated signal for giving notice that the vehicle is approaching the travel attention region Ac (see S11 and S12 in FIG. 5). However, the present invention is not limited to this example in terms of, for example, giving notice that the vehicle 20 is approaching the travel attention region Ac. For example, the entry notice signal Se may indicate the current position information. That is, the entry notice signal Se may be a signal that notifies, from the target vehicle, the vehicle monitoring server 22 of the current position information of the target vehicle, at a time when the vehicle 20 approaches the travel attention region Ac. This is also true of the pass completion signal Sp. In addition, this is also true of the second embodiment.

In the attention region travel control in the first embodiment, a determination as to whether communication with the vehicle monitoring server 22 has succeeded is made (S13 in FIG. 5). However, the present invention is not limited to this example in terms of, for example, for example, the monitoring of the vehicle 20 that enters the travel attention region Ac by using the entry notice signal Se. For example, the AD unit 72 may cause the vehicle 20 to enter the travel attention region Ac without determining whether communication succeeds. In other words, the restricted travel control (S17) may be omitted.

The restricted travel control according to the first embodiment uses switching to manual driving (S21 and S22 in FIG. 6), a bypass (S23 and S24), and a stop (S25) as travel restrictions for the vehicle 20. However, the present invention is not limited to this example as the travel restrictions when, for example, communication with the vehicle monitoring server 22 is not established (FALSE in S13 in FIG. 5). For example, switching to manual driving or a bypass can be omitted. Alternatively, for example, a vehicle speed restriction can be used as another travel restriction. For example, when switching to manual driving is not performed during travel on a snowy road or an intersection, the AD unit 72 can set the target vehicle speed to a lower value.

In the first embodiment, the flows illustrated in FIGS. 5 to 7 are used. However, the contents (the orders of the steps) of the flows are not limited to this example as long as, for example, the effects of the present invention are acquired. For example, the order of the steps in FIG. 6 may be rearranged so as to interchange the combination of steps S23 and S24 with the combination of steps S21 and S22. This is also true of the second and third embodiments.

In the embodiments described above, the comparison between values uses, in some cases, an inequality including the equal sign, and uses, in the other cases, an inequality not including the equal sign (S37 in FIG. 7 or the like). However, when, for example, there is no special meaning for including or excluding the equal sign (in other words, as long as the effects of the present invention are acquired), inclusion or exclusion of the equal sign in comparison between values can be set optionally.

In that sense, for example, the determination as to whether the count value CNT is equal to or less than zero (CNT≤0) can be replaced with the determination as to whether the count value CNT is less than zero (CNT<0) in step S37 in FIG. 7 (however, when the count value CNT can be less than zero).

REFERENCE SIGNS LIST

10: vehicle monitoring system
20: vehicle
22: vehicle monitoring server
62: first communication device
72: automated driving control unit (first control device)
252: second communication device
254: computation device (second control device)
300: railroad crossing Ac: travel attention region
Ipc: current position information (surrounding environment information)
Se: entry notice signal
Sp: pass completion signal

The invention claimed is:

1. A vehicle comprising one or more processors, wherein
the one or more processors perform a first control, and in the first control, the one or more processors perform automated driving control for presetting a travel attention region when performing the automated driving control, and, when the travel attention region is included in a target route or a target trajectory, transmit an entry notice signal to a vehicle monitoring server via a first communication device that communicates with an outside of the vehicle, before the vehicle enters the travel attention region, and
wherein in the first control, the one or more processors request a vehicle occupant to switch to manual driving if transmission of the entry notice signal has not been completed.

2. The vehicle according to claim 1, wherein
in the first control, the one or more processors permit the vehicle to enter the travel attention region on condition that transmission of the entry notice signal has been completed.

3. The vehicle according to claim 1, wherein
when transmission of the entry notice signal has not been completed, in the first control, the one or more processors prohibit the vehicle from entering the travel attention region or permit the vehicle to enter the travel attention region on condition of a predetermined travel restriction.

4. The vehicle according to claim 1, wherein
in the first control, the one or more processors:
determine whether the vehicle has passed through the travel attention region, based on surrounding environment information; and
transmit a pass completion signal to the vehicle monitoring server via the first communication device if it is determined that the vehicle has passed through the travel attention region.

5. The vehicle according to claim 1, wherein
the travel attention region includes a railroad crossing.

6. The vehicle according to claim 1, wherein
in the first control, the one or more processors transmit vehicle occupant information indicating a manned or unmanned state to the vehicle monitoring server, in addition to the entry notice signal, when the travel attention region is included in the target route or the target trajectory of the vehicle.

7. The vehicle according to claim 1, wherein
in the first control, the one or more processors determine that transmission of the entry notice signal has not been completed when an acknowledgment signal is not received from the vehicle monitoring server by a time at which a first predetermined point of time is reached after having transmitted the entry notice signal.

8. The vehicle according to claim 1, wherein, when switching to the manual driving is not completed, in the first control, the one or more processors determine whether it is possible to bypass the travel attention region, and if it is possible to bypass the travel attention region, the one or more processors change the target route or the target trajectory to thereby cause the vehicle to bypass the travel attention region.

9. The vehicle according to claim 8, wherein if it is determined that it is not possible to bypass the travel attention region, in the first control, the one or more processors cause the vehicle to stop in front of the travel attention region.

10. A vehicle monitoring method of monitoring a plurality of vehicles via a vehicle monitoring server, wherein:
each vehicle of a plurality of vehicles comprises one or more processors, and
the one or more processors of each vehicle of the plurality of vehicles:
preset a travel attention region; and
when the travel attention region is included in a target route or a target trajectory, transmit an entry notice signal to the vehicle monitoring server via a first communication device before each vehicle of the plurality of vehicles enters the travel attention region; and
wherein the vehicle monitoring server comprises one or more processors, and
the one or more processors of the vehicle monitoring server:
monitor presence or absence of incoming of the entry notice signal from each of the plurality of vehicles;
when receiving the entry notice signal from a particular vehicle of the plurality of vehicles, monitor presence or absence of incoming of a pass completion signal from the particular vehicle; and
perform an error output when not receiving the pass completion signal by a time at which a second predetermined point of time is reached after having received the entry notice signal from the particular vehicle.

11. The vehicle monitoring method according to claim 10, wherein a time period from reception of the entry notice signal to the time at which the second predetermined point of time is reached is set to a different value depending on a type of the travel attention region.

12. A vehicle monitoring server comprising one or more processors, wherein
the one or more processors perform a second control, and in the second control, the one or more processors:
monitor presence or absence of incoming of an entry notice signal from a plurality of vehicles;
when receiving the entry notice signal from a particular vehicle of the plurality of vehicles, monitor presence or absence of incoming of a pass completion signal from the particular vehicle; and
perform an error output when not receiving the pass completion signal by a time at which a second predetermined point of time is reached after having received the entry notice signal from the particular vehicle.

13. A vehicle monitoring system comprising:
a plurality of vehicles with each vehicle of the plurality of vehicles comprising one or more processors; and
a vehicle monitoring server,
wherein the one or more processors perform a first control, and in the first control, the one or more processors perform automated driving control, for presetting a travel attention region when performing the automated driving control, and, when the travel attention region is included in a target route or a target trajectory, transmit an entry notice signal to the vehicle monitoring server via a first communication device that communicates with an outside of the vehicle, before the vehicle enters the travel attention region, and
wherein in the first control, the one or more processors requests a vehicle occupant to switch to manual driving if transmission of the entry notice signal has not been completed,
wherein the vehicle monitoring server comprises one or more processors, wherein
the one or more processors of the vehicle monitoring server perform a second control, and in the second control, the one or more processors of the vehicle monitoring server:
monitor presence or absence of incoming of the entry notice signal from each of the plurality of vehicles;
when receiving the entry notice signal from a particular vehicle of the plurality of vehicles, monitor presence or absence of incoming of a pass completion signal from the particular vehicle; and
perform an error output when not receiving the pass completion signal by a time at which a second predetermined point of time is reached after having received the entry notice signal from the particular vehicle.

14. A vehicle monitoring method of monitoring a plurality of vehicles via a vehicle monitoring server, wherein:
the plurality of vehicles are each associated with a respective position sensor for detecting a current position of a vehicle to which it is associated;
each vehicle of the plurality of vehicles comprises one or more processors, and
the one or more processors of each vehicle of the plurality of vehicles transmit the current position thereof to the vehicle monitoring server via a first communication device; and
the vehicle monitoring server comprises one or more processors, and
the one or more processors of the vehicle monitoring server:
preset a travel attention region;
monitor the current position received from each vehicle of the plurality of vehicles; and
perform an error output when a particular vehicle of the plurality of vehicles does not pass through the travel attention region by a time at which a third predetermined point of time is reached after the particular vehicle has entered the travel attention region.

* * * * *